United States Patent
Webster et al.

(10) Patent No.: US 9,380,343 B2
(45) Date of Patent: Jun. 28, 2016

(54) WATCH NEXT SERVICE

(71) Applicant: Verizon Patent and Licensing Inc., Arlington, VA (US)

(72) Inventors: Christopher Webster, Redwood City, CA (US); Christopher Habliston, San Jose, CA (US); Igor Nekrestyanov, Santa Clara, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 14/473,566

(22) Filed: Aug. 29, 2014

(65) Prior Publication Data

US 2016/0066040 A1   Mar. 3, 2016

(51) Int. Cl.
| | |
|---|---|
| *H04N 21/258* | (2011.01) |
| *H04N 21/442* | (2011.01) |
| *H04N 21/475* | (2011.01) |
| *H04N 21/466* | (2011.01) |
| *H04N 21/239* | (2011.01) |
| *H04N 21/262* | (2011.01) |
| *H04N 21/45* | (2011.01) |
| *H04N 21/458* | (2011.01) |

(52) U.S. Cl.
CPC ....... *H04N 21/4668* (2013.01); *H04N 21/2393* (2013.01); *H04N 21/25883* (2013.01); *H04N 21/25891* (2013.01); *H04N 21/26258* (2013.01); *H04N 21/44204* (2013.01); *H04N 21/44222* (2013.01); *H04N 21/4532* (2013.01); *H04N 21/4586* (2013.01); *H04N 21/4667* (2013.01)

(58) Field of Classification Search
None
See application file for complete search history.

(56) References Cited

U.S. PATENT DOCUMENTS

| | | | | |
|---|---|---|---|---|
| 2012/0096488 | A1* | 4/2012 | Wei | H04N 21/44016 725/34 |
| 2015/0229991 | A1* | 8/2015 | Cordray | G06F 3/0482 725/10 |

OTHER PUBLICATIONS

ISAN: International Standard Audiovisual Number, "ISAN Frequently Asked Questions," ISAN International Agency, Version: 6.0, Jan. 2008, 11 pages.

* cited by examiner

*Primary Examiner* — Brian T Pendleton
*Assistant Examiner* — Jean D Saint Cyr (57) ABSTRACT

A device receives, from a media client, information associated with an event. The device identifies a user profile, associated with the event, including a tracking list which identifies one or more tracked series and a last watched list which identifies one or more last watched episodes associated with one or more watched series. The device determines a next available episode, associated with one of the one or more tracked series, based on the user profile, the information received from the media client, and content metadata which includes information associated with one or more available episodes associated with one or more available series. The device sends a suggestion identifying the next available episode to the media client for presentation to a user associated with the media client.

20 Claims, 9 Drawing Sheets

WATCH NEXT SERVICE

BACKGROUND

Viewable content is often presented to a viewer in segments. For example, a single show may comprise a series of episodes, or a sports season may comprise a series of matches. Further a viewer may simultaneously track more than one show or sport interest. At a particular time, a viewer may have already watched one or more segments of one or more shows or sports seasons, and one or more additional segments may be available to watch next.

DETAILED DESCRIPTION OF PREFERRED EMBODIMENTS

The following detailed description of example implementations refers to the accompanying drawings. The same reference numbers in different drawings may identify the same or similar elements.

Viewers may have numerous options when deciding what content to watch. A user of a media client may previously have watched various episodes of several shows and may wish to resume one of those shows. Alternatively, or additionally, the user may also express an interest in other periodic or episodic content, such as sports games, news broadcasts, television shows, or the like. Keeping track of content availability and watch history may complicate the user's experience. Implementations described herein may assist a user of a media client in tracking content and watching next available episodes of tracked content.

Figure 1:
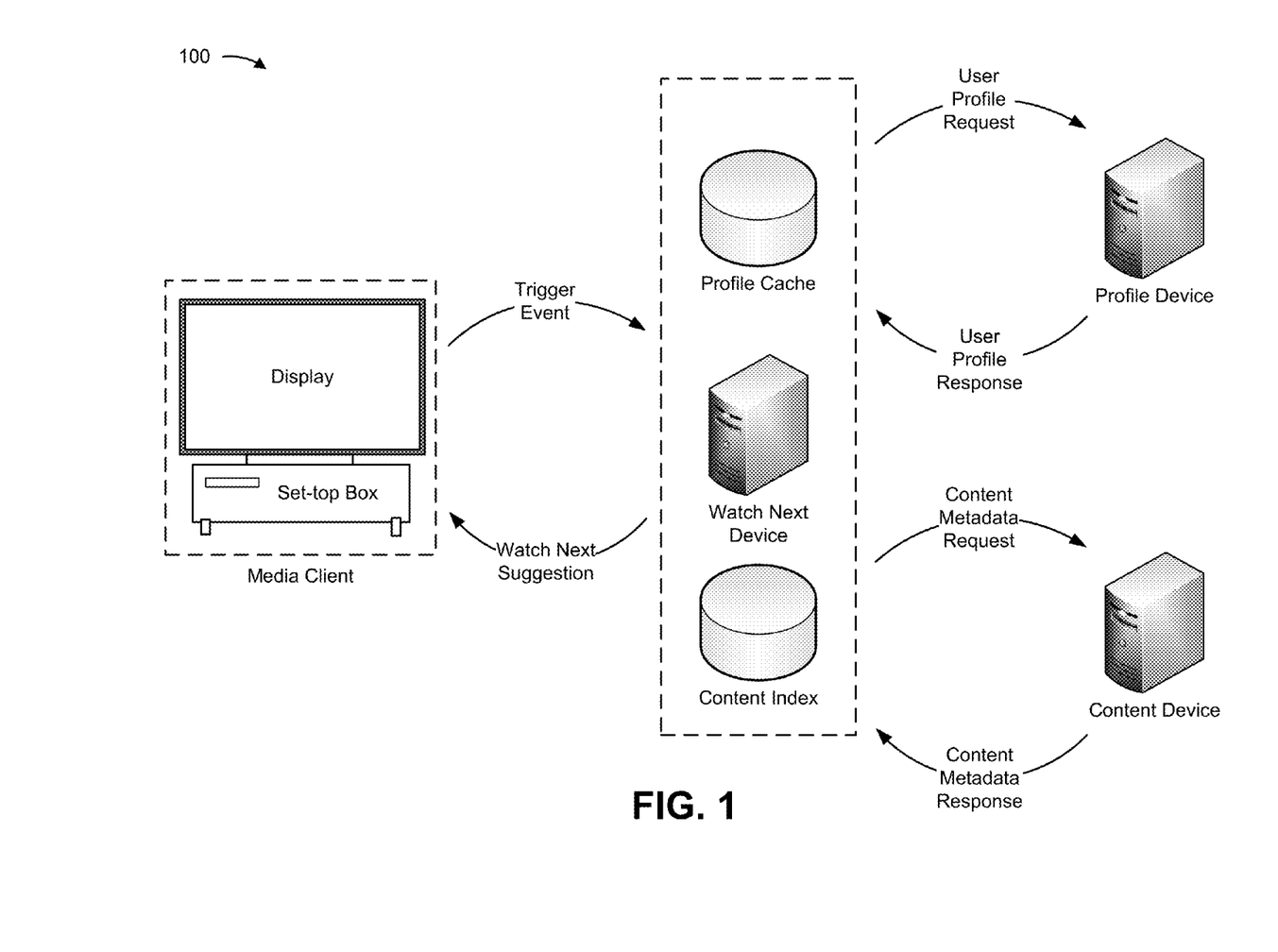
FIG. 1 is a diagram of an overview of an example implementation described herein.

FIG. 1 is a diagram of an overview of an example implementation 100 described herein. As shown in FIG. 1, example implementation 100 may include a media client, such as a set-top box, a watch next device, a profile device, and a content device.

To provide a watch next suggestion, the watch next device may maintain a profile cache and a content index. The watch next device may obtain user profile information, stored in the profile cache, by sending, to the profile device, a user profile request, and receiving, from the profile device, a user profile response. User profile information may include various information associated with a media client and/or a user of the media client including, e.g., subscription information and/or one or more lists of tracked series, watched episodes, and/or most recent watched episodes. Likewise, the watch next device may obtain content metadata, identified in the content index, by sending, to the content device, a content metadata request, and receiving, from the content device, a content metadata response. Content metadata may include various information associated with content including, e.g., an episode identifier, a series identifier, availability information, etc. The watch next device may receive, from the media client, a request identifying a trigger event. The watch next device may send, to the media client, a watch next suggestion based on the trigger event, the content index, and/or the profile cache associated with the media client and/or a user of the media client. In this way, the watch next device may track an event, watch history, and/or tracking list associated with the user to provide, to the media client, a watch next suggestion identifying one or more next available episodes of the user's tracked content.

Figure 2:
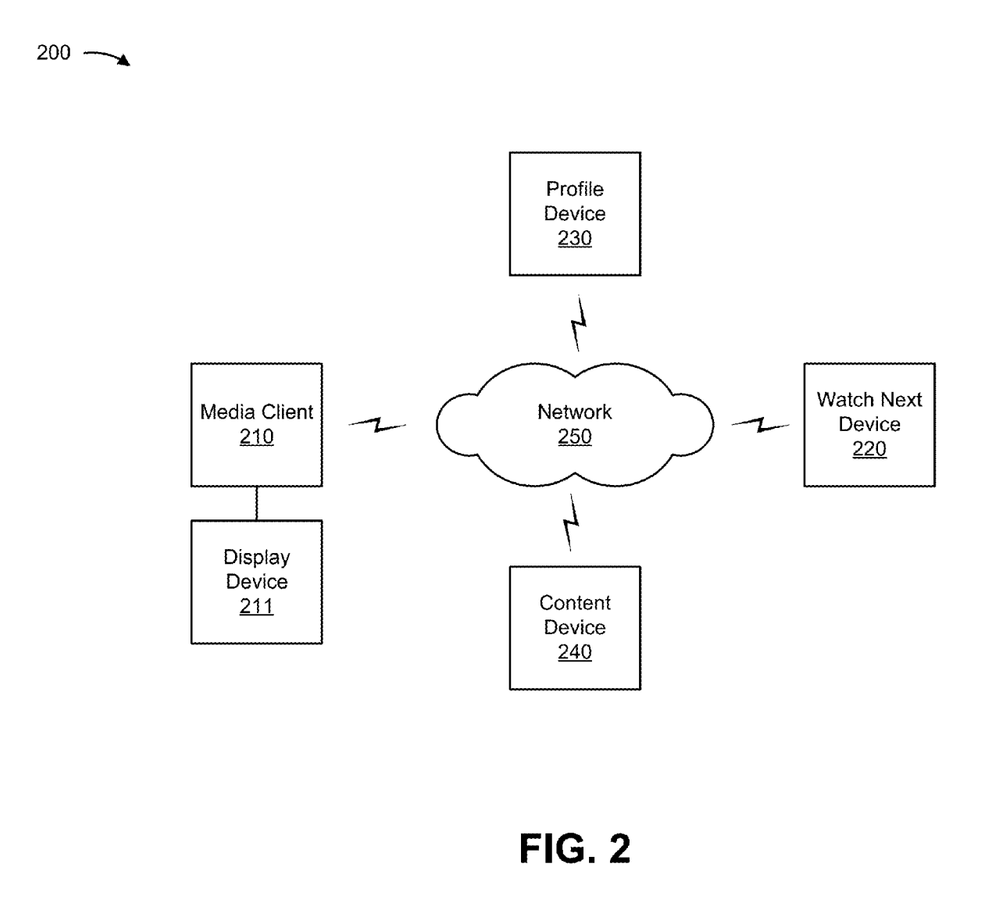
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include media client 210, display device 211, watch next device 220, profile device 230, content device 240, and network 250. Devices of environment 200 may interconnect via wired connections, wireless connections, or a combination of wired and wireless connections.

Media client 210 may include a device capable of receiving, transmitting, and/or processing multimedia content and providing the multimedia content to a user (e.g., via display device 211). Examples of media client 210 may include a set-top box, a casting stick (e.g., a high-definition media interface (HDMI) dongle), a mobile phone (e.g., a smart phone, a radiotelephone, etc.), a laptop computer, a tablet computer, a personal computer, a handheld computer, a cable card, a gaming device, a portable electronic device, a personal communications system (PCS) terminal (e.g., that may combine a cellular radiotelephone with data processing and data communications capabilities), and/or another type of device capable of receiving, transmitting, and/or processing multimedia content and providing the multimedia content to a user. In some implementations, media client 210 may receive information from and/or transmit information to another device in environment 200 via network 250. For example, media client 210 may send and/or receive information to/from watch next device 220.

Display device 211 may include any digital or analog display that is capable of presenting audio and/or video content provided by media client 210. Display device 211 may include a display technology, such as cathode ray tube (CRT) display, liquid crystal display (LCDs), light-emitting diode (LED) display, plasma display, etc. Examples of display device 211 may include a television, a projector, a computer monitor, and/or another type of device capable of presenting audio and/or video content. In some implementations, display device 211 may display content received from media client 210 and/or information associated with a watch next suggestion sent from watch next device 220.

Watch next device 220 may include one or more devices capable of storing, processing, and/or routing information. For example, watch next device 220 may include a server device or a similar type of device. In some implementations, watch next device 220 may include a communication interface that allows watch next device 220 to receive information from and/or transmit information to other devices in environment 200. In some implementations, watch next device 220 may send, receive, and/or store content metadata and/or user profile data. Watch next device 220 may respond to an event associated with media client 210 by sending, to media client 210, a watch next suggestion based on the event, content metadata, and user profile data.

Profile device 230 may include one or more devices capable of storing, processing, and/or routing user profile information. For example, profile device 230 may include a server device or a similar type of device. In some implementations, profile device 230 may include a communication interface that allows profile device 230 to receive information from and/or transmit information to other devices in environment 200. In some implementations, profile device 230 may send, receive, and/or store user profile information, associated with a user of media client 210, used to track content associated with media client 210 and/or to track content associated with a user of media client 210.

Content device 240 may include one or more devices capable of storing, processing, and/or routing content information. For example, content device 240 may include a server device or a similar type of device. In some implementations, content device 240 may include a communication interface that allows content device 240 to receive information from and/or transmit information to other devices in environment 200. In some implementations, content device 230 may send, receive, and/or store content metadata used to identify, track, and/or determine availability of content.

Network 250 may include one or more wired and/or wireless networks. For example, network 250 may include a cellular network (e.g., a Long-Term Evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, a television network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
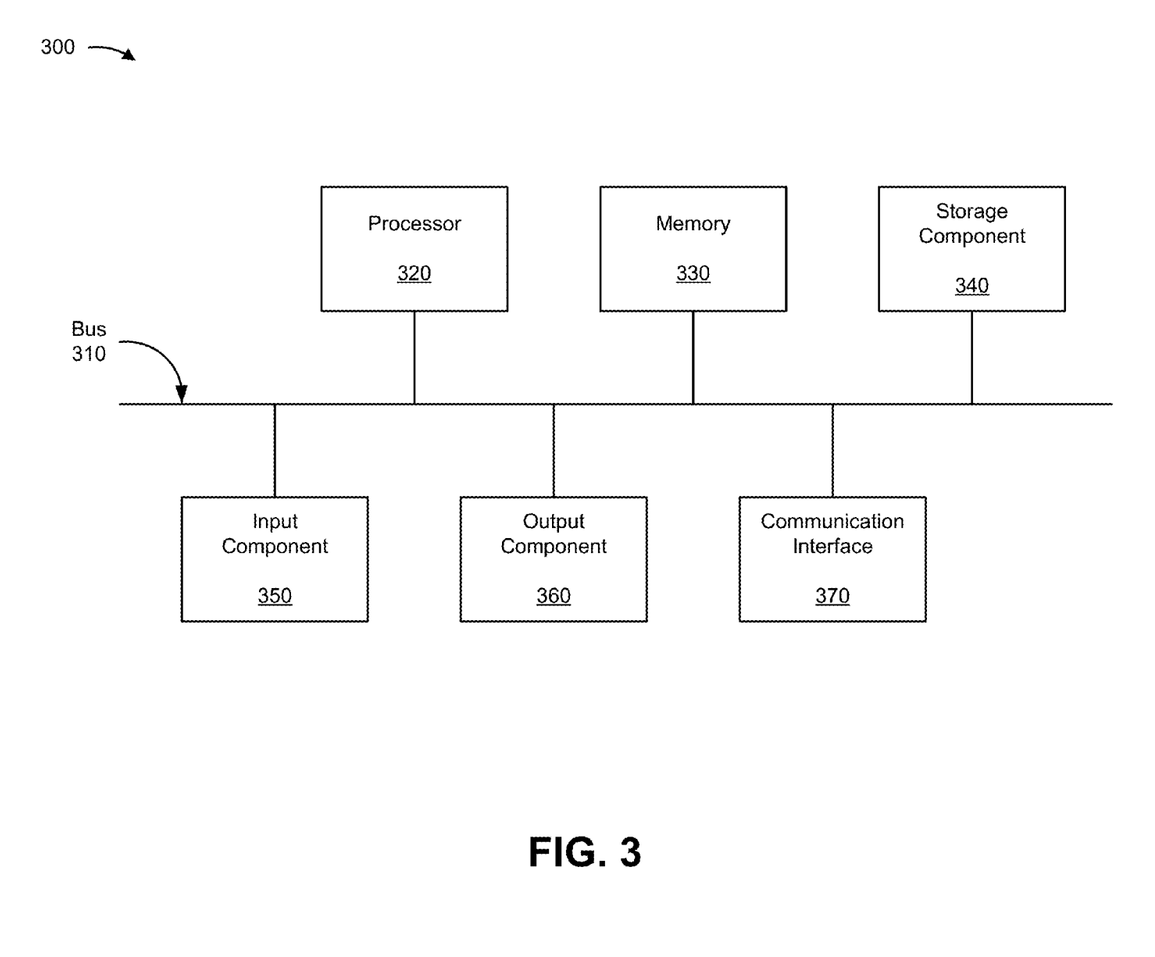
FIG. 3 is a diagram of example components of one or more devices of FIG. 2.

FIG. 3 is a diagram of example components of a device 300. Device 300 may correspond to media client 210, display device 211, watch next device 220, profile device 230, and/or content device 240. In some implementations, media client 210, display device 211, watch next device 220, profile device 230, and/or content device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
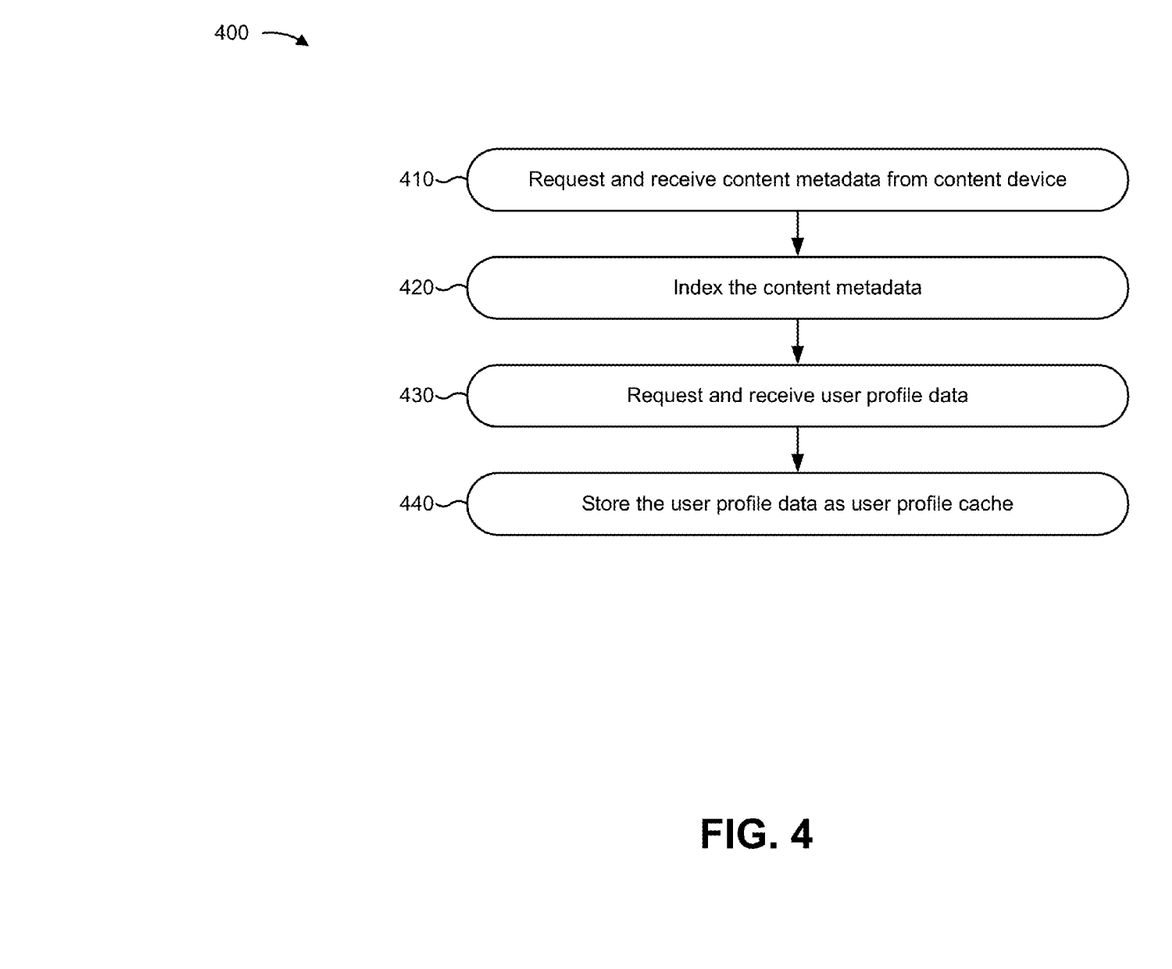
FIG. 4 is a flow chart of an example process for setting up a watch next service.

FIG. 4 is a flow chart of an example process 400 for setting up a watch next service. In some implementations, one or more process blocks of FIG. 4 may be performed by watch next device 220. Additionally, or alternatively, one or more process blocks of FIG. 4 may be performed by another device or a group of devices separate from or including watch next device 220, such as media client 210, display device 211, profile device 230, and/or content device 240.

As shown in FIG. 4, process 400 may include requesting and receiving content metadata from a content device (block 410). For example, watch next device 220 may send, to content device 240, a request for content metadata. Content device 240 may determine, based on content information stored by content device 240, the availability of various content and may send, to watch next device 220, a response including content metadata associated with available content. Available content may include, e.g., an episode of video and/or audio content which is currently available for playing (e.g., via on-demand, recording, and/or live stream). Alternatively, or additionally, available content may include content available in the future. Content metadata may include information associated with a content identifier (such as an International Standard Audiovisual Number (ISAN)), series, season, episode, release date/time, title, description, image, preview video/audio, run time, content provider, format, universal resource identifier/link (URI/URL), availability date/time, expiration information, subscription requirement, use restriction, genre, rating, or the like. Watch device 220 may use the received content metadata to determine which next episode(s) to identify in a watch next suggestion sent to media client 210.

As further shown in FIG. 4, process 400 may include indexing the content metadata (block 420). For example, watch next device 220 may index the content metadata by series to provide a watch next suggestion for an episode of a series. Alternatively, or additionally, watch next device 220 may index the content metadata by content provider, date/time, content identifier, and/or another content metadata type. Indexing the content metadata improves the performance of determining a watch next suggestion based on an indexing criterion. For example, watch next device 220 may use a series index to identify content metadata associated with episodes of a series for which to send a watch next suggestion identifying a next episode of the series. Additionally, or alternatively, watch next device 220 may use a time-slot index to identify content metadata associated with episodes of a time period for which to send a watch next suggestion identifying a next episode for the time period.

As further shown in FIG. 4, process 400 may include requesting and receiving user profile data (block 430). For example, watch next device 220 may send, to profile device 230, a request for user profile data. Profile device 230 may send, to watch next device 220, a user profile response, based on information stored by profile device 230, including one or more user profiles associated with one or more users of, e.g., network 250 and/or media client 210 associated with a particular service provider. A user profile may be associated with media client 210 and/or a user of media client 210 and may include, e.g., a user identifier, media client identifier, a subscription identifier, watch history, last watched list, tracking list, or the like. The watch history may identify, e.g., accessed and/or completed content associated with the user profile. The last watched list may identify, e.g., for each series, the latest (e.g., most recently released/aired) episode identified in the user profile's watch history. The tracking list may identify, e.g., one or more series associated with the user profile. Watch next device 220 may use the watch history, last watched list, and/or tracking list to identify a next episode which is more recent than a last watched episode, and send a watch next suggestion, identifying the next episode, to media client 210.

As further shown in FIG. 4, process 400 may include storing the user profile data in a user profile cache (block 440). For example, watch next device 220 may store the user profile information, received from profile device 230, in memory accessible to watch next device 220. Alternatively, or additionally, watch next device 220 may update user profile information stored in the user profile cache and send the updated user profile information to profile device 230 for storage in memory accessible to profile device 230. Watch next device 220 may store and update user profile information, received from profile device 230, to provide a watch next suggestion to media client 210.

In this way, watch next device 220 may set up a watch next service for providing a watch next suggestion to a media client 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
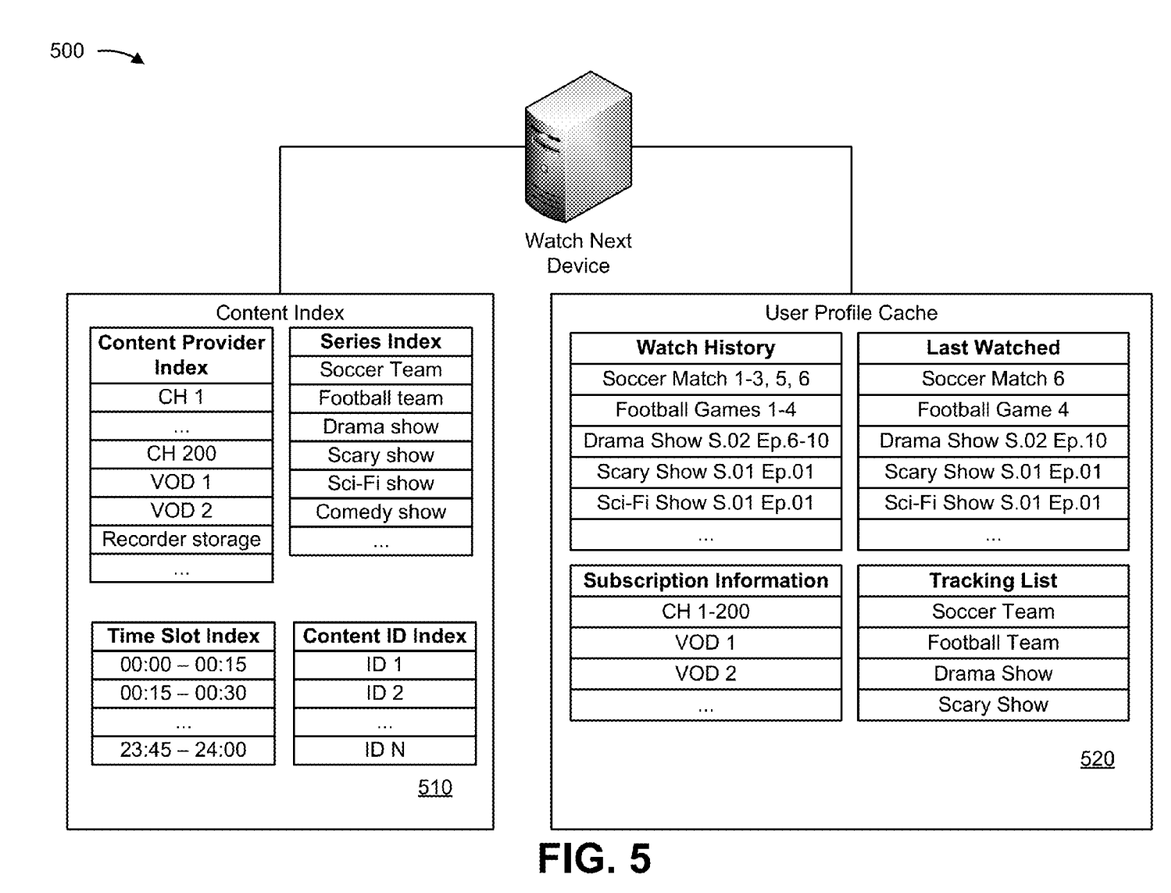
FIG. 5 is a diagram of an example implementation, and associated data structures, relating to the example process shown in FIG. 4.

FIG. 5 is a diagram of an example implementation 500, and associated data structures 510 and 520, relating to the example process 400 shown in FIG. 4. FIG. 5 shows an example of a watch next device 220 setup to provide a watch next service.

As shown in FIG. 5, assume, for example implementation 500, that watch next device 220 receives from, e.g., content device 240, content metadata identifying, e.g., available content and/or a content schedule. Watch next device 220 may generate and store one or more indices associated with the received content metadata and store the indices, e.g., in a content index 510. Content index 510 may include, e.g., a content provider index identifying available content providers (e.g., broadcast channels 1-200, video-on-demand services 1 and 2, recorder storage, etc.); a series index identifying available series (e.g., a soccer team, football team, drama show, scary show, sci-fi show, comedy show, etc.); a time slot index which likewise identifies content metadata based on, e.g., a release date/time and/or broadcast date/time (e.g., by dividing a day into 15-minute time intervals); and/or a content identifier index which identifies content metadata based on a content identifier (e.g., ID 1 through ID N for N available episodes). By indexing and storing content metadata using content index 510, watch next device 220 may identify a next available episode based on an indexing criterion to provide a watch next suggestion.

Assume, for example implementation 500, that watch next device 220 receives from, e.g., profile device 230, a user profile associated with media client 210 and/or a user of media client 210. Watch next device 220 may store the user profile, e.g., in user profile cache 520. User profile cache 520 may include a watch history, associated with the user profile, identifying watched episodes (e.g., soccer matches 1-3, 5, and 6; football games 1-4; drama show season 2, episodes 6-10; scary show season 1, episode 1; and sci-fi show season 1, episode 1). User profile cache 520 may further include a last watched list, associated with the user profile, identifying a newest watched episode from each series identified in the watch history (e.g., soccer match 6; football game 4; drama show season 2, episode 10; scary show season 1, episode 1; and sci-fi show season 1, episode 1). User profile cache 520 may further include subscription information, associated with the user profile, identifying available content providers (e.g., channels 1 through 200 and VOD services 1 and 2) associated with an account of a user of media client 210. User profile cache 520 may further include a tracking list, associated with the user profile, identifying series associated with a watch next suggestion (e.g., the soccer team, football team, drama show, and scary show). Watch next device 220 may use the user profile stored in user profile cache 520 to determine what content is tracked and what content has already been watched to provide a suggestion for what episode(s) to watch next.

Watch next device 220 may use content index 510 and user profile cache 520 together to identify the availability of a next episode in a tracked series to thereby provide a watch next recommendation to media client 210.

As indicated above, FIG. 5 is provided merely as an example. Other examples are possible and may differ from what was described with regard to FIG. 5.

Figure 6:
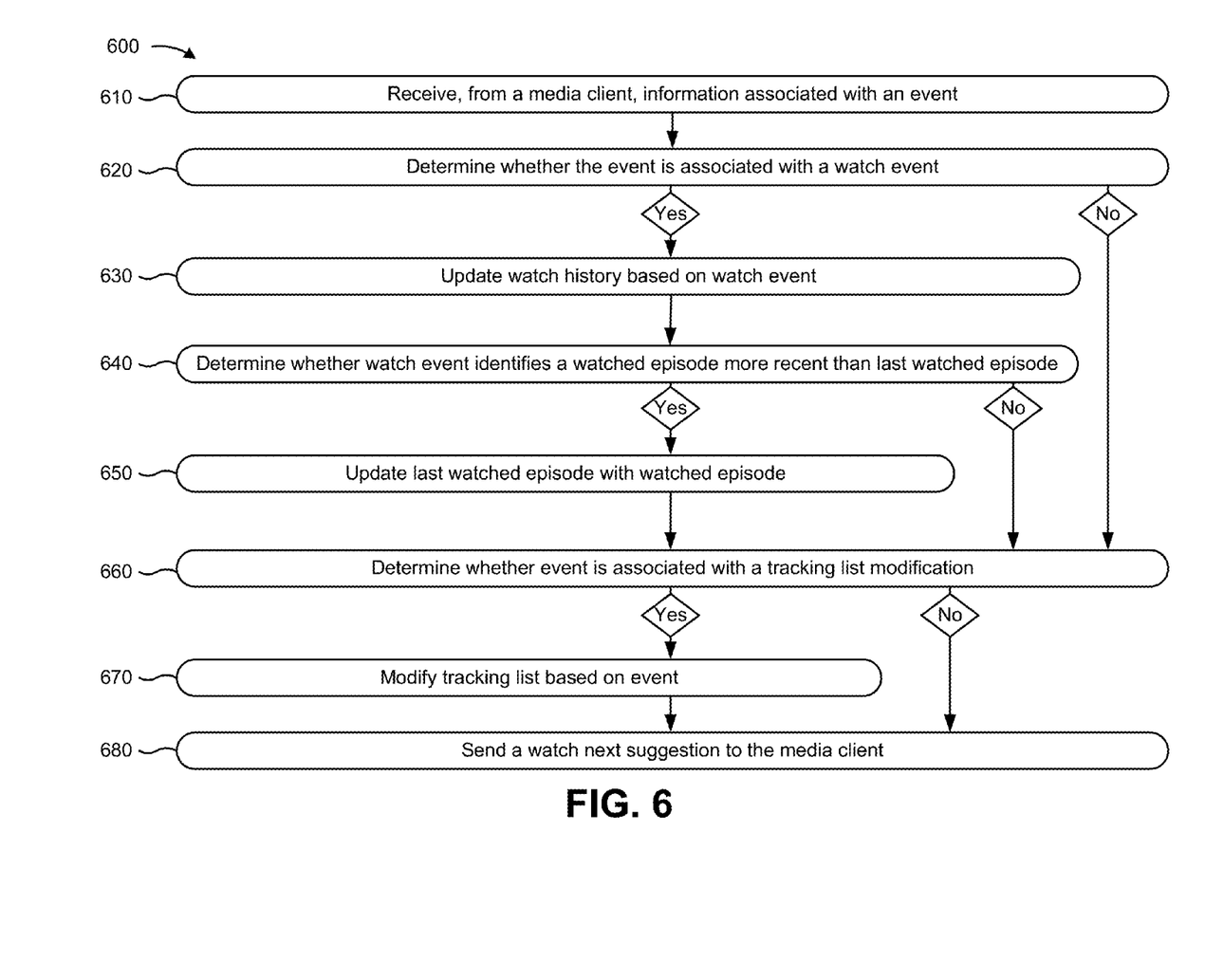
FIG. 6 is a flow chart of an example process for using a watch next service.

FIG. 6 is a flow chart of an example process 600 for using a watch next service. In some implementations, one or more process blocks of FIG. 6 may be performed by watch next device 220. In some implementations, one or more process blocks of FIG. 6 may be performed by another device or a group of devices separate from or including watch next device 220, such as media client 210, display device 211, profile device 230, and/or content device 240.

As shown in FIG. 6, process 600 may include receiving, from a media client, information associated with an event (block 610). An event may include, e.g., a watch event (e.g., starting, completing, partially completing, or recording an episode), explicit tracking list modification (e.g., user input directing media client 210 and/or watch next device 220 to start or stop tracking a particular series), and/or an explicit watch next request (e.g., user input directing media client 210 and/or watch next device 220 to provide a watch next suggestion). Watch next device 220 may access and/or update a user profile associated with media client 210 and/or the user of media client 210 based on the event information received from media client 210.

As further shown in FIG. 6, process 600 may include determining whether the event is associated with a watch event (block 620). For example, the information received from media client 210 may identify a watched episode (using e.g., a content identifier) and may further indicate a watch progress associated with the watched episode (using e.g., a timestamp, watch time, etc.). Media client 210 and/or watch next device 220 may determine that the event is associated with a watch event based on, e.g., the satisfaction of a threshold (e.g., playing more than a certain percentage of an episode and/or playing an episode to within a certain time of the episode's end). Watch next device 220 may thus infer, based on determining that the event constitutes a watch event, that a user of media client 210 has watched the watched episode. If watch next device 220 determines that the event is not associated with a watch event, watch next device 220 may proceed to block 660.

As further shown in FIG. 6, process 600 may include updating a watch history based on the watch event (block 630). For example, watch next device 220 may, based on identifying a watch event, add the watched episode to a watch history associated with the user and/or media client 210. Associating the watch history with media client 210 may allow a group of users to maintain a shared watch history. For example, media client 210 may be associated with a particular location (e.g., family room, bedroom, vacation house, office, etc.) and/or a subset of a user group (e.g., children, parents, guests, etc.), and watch next device 220 may use the watch history to provide suggestions based on episodes watched in the particular room and/or by the particular subset of the user group. Alternatively, or additionally, watch next device 220 may use the watch history to track a particular user's watching habits to provide a personalized watch next suggestion based on that user's watch history. Watch next device 220 may further update the watch history with other information received from media client 210, such as a timestamp and/or content metadata associated with the watched episode.

As further shown in FIG. 6, process 600 may include determining whether the watch event identifies a watched episode more recent than a last watched episode (block 640). For example, watch next device 220 may determine, based on content metadata associated with the watched episode, that the watched episode is more recent (e.g., has a later release/air date) than a last watched episode, identified in a last watched list associated with the user and/or media client 210, of a series associated with the watched episode. If watch next device 220 determines that the watch event does not identify a watched episode more recent than the last watched episode, watch next device 220 may proceed to block 660.

As further shown in FIG. 6, process 600 may include updating a last watch episode with the watched episode (block 650). For example, based on a determination that the watch event identifies a watched episode more recent than a last watched episode, watch next device 220 may modify the last watched list, associated with the user and/or media client 210, to identify the watched episode as the last watched episode of the series associated with the watched episode. Alternatively, or additionally, watch next device 220 may send, to profile device 230, a request, identifying the watched episode and the user profile associated with the user and/or media client 210, to modify the last watched episode of the series associated with the watched episode. Watch next device 220 may associate the last watched list with media client 210 to suggest a watch next episode based on the most recent episode(s) displayed using media client 210. Alternatively, or additionally, watch next device 220 may associated the last watched list with a particular user of media client 210 to provide a personalized watch next suggestion based on the user's personal last watched list.

As further shown in FIG. 6, process 600 may include determining whether the event is associated with a tracking list modification (block 660). For example, the event may include an explicit tracking request (e.g., user input identifying a series and indicating that the series should be added/removed to/from the tracking list) and/or an implicit tracking request (e.g., satisfying a threshold for a quantity of episodes of a series identified in the watch history and/or a change in availability/subscription). Additionally, or alternatively, the event may be associated with modifying a ranking associated with a series identified in the tracking list. For example, the event may include an explicit ranking request (e.g., user input identifying a series and indicating a change in the series ranking) and/or an implicit ranking request (e.g., based on a quantity of episodes of a series identified in a user's watch history and/or a timestamp associated with an episode in a last watched list and/or watch history).

As further shown in FIG. 6, process 600 may include modifying a tracking list based on the event (block 670). For example, based on determining that the event is associated with adding/removing a series to/from a tracking list associated with the user and/or media client 210, watch next device 220 may add/remove the series to/from the tracking list. Additionally, or alternatively, watch next device 220 may modify one or more series rankings associated with the watch list based on the event. Watch next device 220 may associate the tracking list with media client 210 to provide a watch next suggestion based on tracked series associated with media client 210 (e.g., to provide suggestions based on a location, user group, etc. associated with media client 210). Alternatively, or additionally, watch next device 220 may associate the tracking list with a particular user of media client 210 to provide the user with a personalized watch next suggestion.

As further shown in FIG. 6, process 600 may include sending a watch next suggestion to the media client (block 680). For example, watch next device 220 may identify a next available episode, for a series identified in the tracking list, based on content metadata associated with a last watched episode identified in the last watched list associated with the user and/or media client 210, subscription information associated with the user and/or media client 210, and/or availability information received from content device 230. Watch next device 220 may send, to media client 210, a watch next suggestion identifying the next available episode and including, e.g., content metadata and/or availability information associated with the next available episode.

Watch next device 220 may determine which next available episode to identify in the watch next suggestion based on, e.g., availability of the episode, ranking of the series, type of event, or the like. For example, the watch next suggestion may identify a next available episode based on satisfying an availability threshold (e.g., an episode which is available to watch now or within a threshold number of minutes, hours, or days); based on satisfying a ranking threshold (e.g., based on an absolute and/or relative ranking of a series associated with an episode); and/or based on an association with the event (e.g., an episode associated with a watch event and/or a series identified in a tracking list modification). Watch next device 220 may identify, in the watch next suggestion, more than one next available episode from more than one series identified in the tracking list associated with the user and/or media client 210.

Based on the watch next suggestion sent from watch next device 220, media client 210 may present a user with one or more options for content to watch next. Using the content metadata received from content device 240 and the user profile associated with the user, watch next device 220 may track episodic content for the user to enable the user to easily resume available series.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
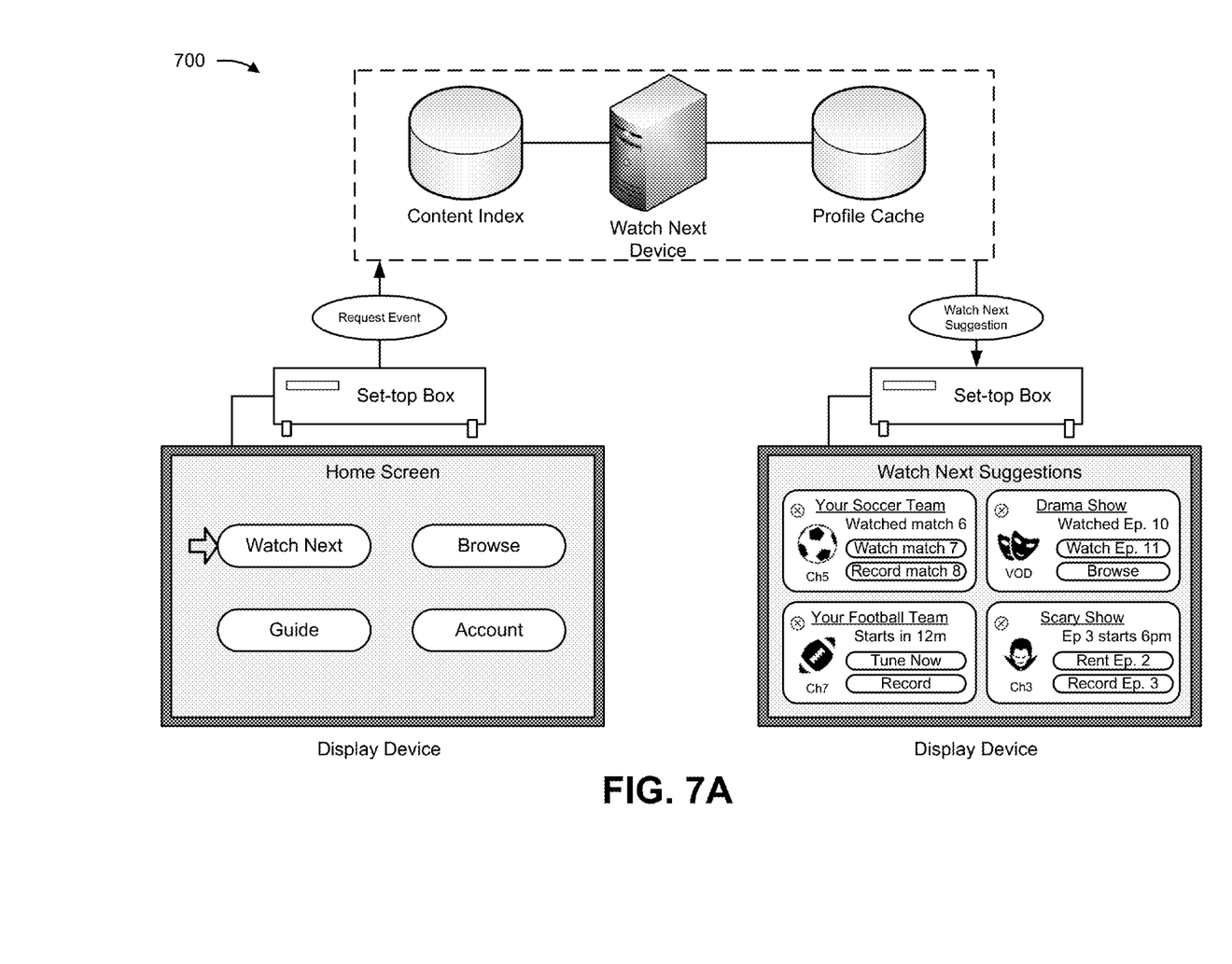
FIGS. 7A-7C are diagrams of an example implementation relating to the example process shown in FIG. 6.
Figure 7B:
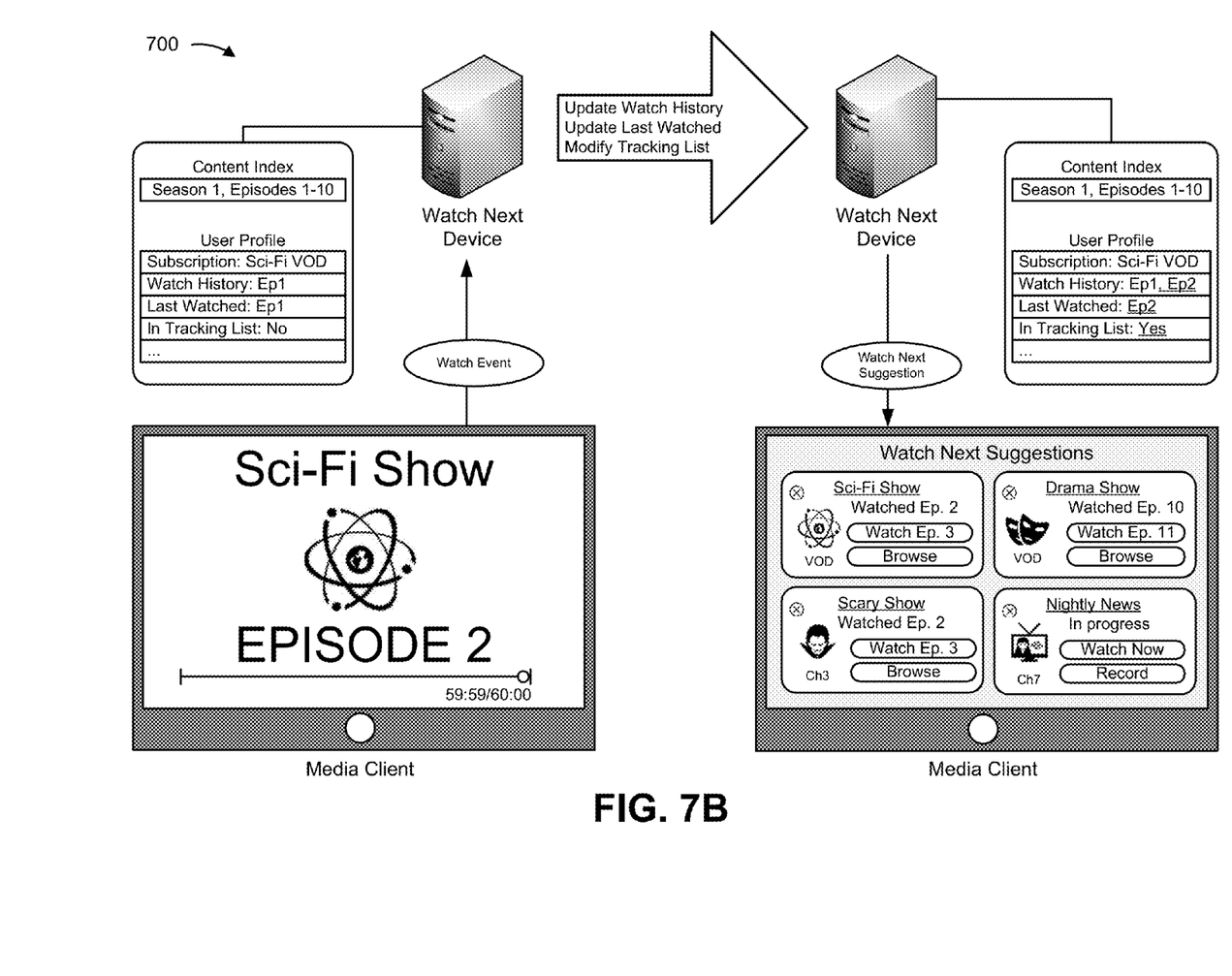
Figure 7C:
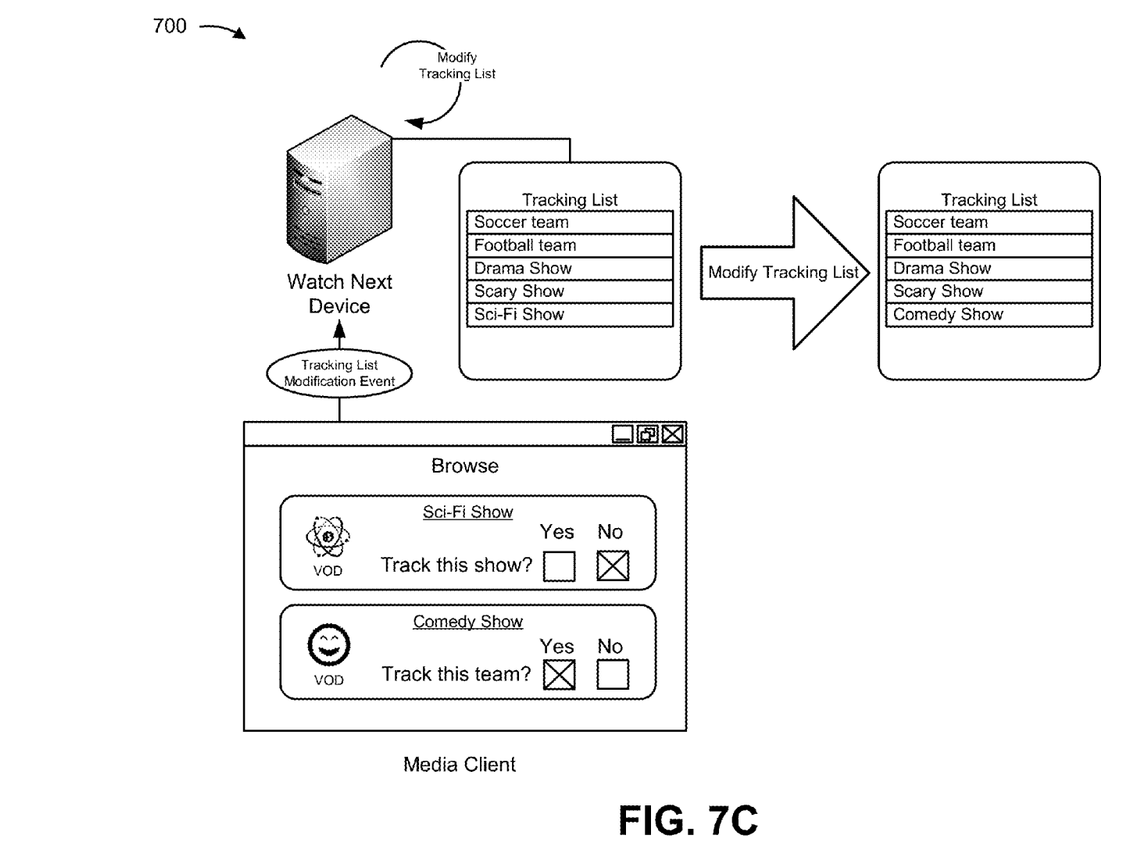

FIGS. 7A-7C are diagrams of an example implementation 700 relating to example process 600 shown in FIG. 6. FIGS. 7A-7C show an example of using a watch next service.

As shown in FIG. 7A, assume, for example 700, that watch next device 220 has been set up according to example implementation 500 shown in FIG. 5. Assume further that a user of a media client (set-top box) provides input directing the media client to load a watch next screen. Based on this input, media client 210 may send, to watch next device 220, information associated with a request event, indicating the user's request for a watch next suggestion.

Assume, for example implementation 700, that the tracking list identifies a soccer team, that the last watched list identifies match 6, and that the content index indicates that match 7 was played yesterday and match 8 is scheduled for the following week. Assume further that the tracking list identifies a football team and that the content index indicates that the football team's next game will be available in 12 minutes on channel 7. Assume further that the tracking list identifies a drama show, that the last watched list identifies season 2 episode 10 as the last watched episode of the drama show, that the content index indicates that the drama show is available for on demand streaming via VOD 1, and that the subscription information indicates that VOD 1 is available to the user. Assume further that the tracking list identifies a scary show, that the last watched list identifies season 1 episode 1 as the last watched episode of the scary show, that a user may rent the second episode from a content provider using the media client, and that the third episode of the scary show will be available at 6 pm on channel 3.

Based on the information stored in the profile cache associated with the user of media client 210, watch next device 220 may send, to media client 210, a watch next suggestion identifying the next available games/episodes. Media client 210 may display, to the user, options for watching the next available episodes. Assume, for example implementation 700, that media client 210 stores a recording of the soccer team's match 7. Media client 210 may display an option for watching the recorded match 7 and/or an option for recording match 8. Media client 210 may further display an option for tuning to channel 7 in advance of the next football game's beginning and/or an option to record the football game. Media client 210 may further display an option to watch episode 11 of the drama show from on-demand content provider VOD1 and/or an option to browse more episodes. Media client 210 may further display an option to rent episode 2 of the scary show and/or an option to record episode 3.

As shown in FIG. 7B, assume, for example 700, that at a later time, the user uses another media client 210 to watch episode 2 of the Sci-Fi show. At or near the completion of the episode, media client 210 may send information to watch next device 220 identifying a watch event for the completed episode. Watch next device 220 may update the user profile associated with the user by adding the watched episode to the user's watch history and modifying the last watched list to identify episode 2 as the last watched episode of the Sci-Fi show. Watch next device 220 may further determine that the quantity (e.g., 2) of Sci-Fi show episodes in the user's watch history is associated with an implicit tracking list modification and may identify the Sci-Fi show in the user's tracking list. Watch next device 220 may further determine, based on the content index and user subscription information, that the next Sci-Fi show episode (episode 3) is available through the user's subscription to a VOD service. Watch next device 220 may send, to media client 210, a watch next suggestion identifying the next episode (episode 3) of the Sci-Fi show as well as other next episodes and their availability. Media client 210 may receive the watch next suggestion and display one or more options for watching, browsing, and/or recording the next episodes identified in the watch next suggestion.

As shown in FIG. 7C, assume, for example 700, that the user provides input, to media client 210, indicating removal of the Sci-Fi show from the tracking list and addition of a Comedy show to the tracking list. Media client 210 may send, to watch next device 220, information associated with this tracking list modification event. Watch next device 220 may modify the tracking list associated with the user by removing the Sci-Fi show from the tracking list and adding the Comedy show to the tracking list.

In this way, watch next device 220 may keep track of series for the user of media clients 210 and may further provide the user with one or more watch next suggestions to assist the user in maintaining a continuous content watching experience.

As indicated above, FIGS. 7A-7C are provided merely as an example. Other examples are possible and may differ from what was described with regard to FIGS. 7A-7C.

Implementations described herein may track episodic content and history for a user by maintaining and updating a user profile associated with the user to provide a suggestion for an available episode following the user's last watched episode.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, the term series refers to a collection of associated segments of video, audio, and/or text content. Although example implementations described above may refer to viewing, tracking, and/or suggesting episodes of a television series and/or games associated with a sport's team, viewing, tracking, and/or suggesting episodes of other viewable content (e.g., books and articles associated with an author, topic, publisher, etc.) and/or listening content (e.g., from a radio series, online stream, etc.) may be provided in some implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive, from a media client, information associated with an event;
   identify a user profile, including a tracking list and a last watched list, associated with the event,
      the tracking list identifying one or more tracked series,
      the last watched list identifying one or more last watched episodes associated with one or more watched series;
   determine a suggested episode, associated with one of the one or more tracked series and one of the one or more last watched episodes, based on the information received from the media client and content metadata,
      the content metadata including information associated with one or more available episodes associated with one or more available series,
      the suggested episode being determined based on satisfying an availability threshold, based on satisfying a ranking threshold, and based on an association between the suggested episode and the event,
      the availability threshold indicating that the suggested episode is available to be watched within a particular time period,
      the ranking threshold indicating that the one of the one or more tracked series, associated with the suggested episode, satisfies a particular ranking; and
   send a suggestion identifying the suggested episode to the media client for presentation to a user associated with the media client.

2. The device of claim 1, where the one or more processors are further to:
   determine, based on the information received from the media client, if the event is associated with a watched episode; and
   based on determining that the event is associated with a watched episode:
      identify a watched series, from the one or more watched series, associated with the watched episode; and
      update a watch history, associated with the watched series and included in the user profile, with the watched episode.

3. The device of claim 2, where the one or more processors, when determining that the event is associated with the watched episode, are to:
- determine if the watched episode is more recent than a last watched episode, from the one or more last watched episodes, associated with the watched series and identified in the last watched list; and
- update the last watched list with the watched episode based on determining that the watched episode is more recent than the last watched episode.

4. The device of claim 2, where the one or more processors, when determining that the event is associated with the watched episode, are to:
- determine if a quantity of episodes, associated with the watched series and identified in the watch history, satisfies a threshold; and
- add the watched series to the tracking list based on determining that the quantity of episodes satisfies the threshold.

5. The device of claim 1, where the one or more processors, when determining the suggested episode, are to:
- identify a tracked series from the one or more tracked series identified in the tracking list;
- identify a last watched episode, associated with the tracked series, from the one or more last watched episodes identified in the last watched list; and
- determine the suggested episode, more recent than the last watched episode, associated with the tracked series.

6. The device of claim 1, where the one or more processors, when determining the suggested episode, are to:
- identify a tracked series from the one or more tracked series identified in the tracking list;
- identify subscription information, from the user profile, associated with one or more next episodes of the tracked series;
- identify availability information, from the content metadata, associated with the one or more next episodes of the tracked series; and
- determine the suggested episode, from the one or more next episodes, based on the subscription information and the availability information.

7. The device of claim 1, where the one or more processors are further to:
- receive the content metadata from a first device; and
- receive the user profile from a second device,
  - the first device being different from the second device.

8. A non-transitory computer-readable medium storing instructions, the instructions comprising:
- one or more instructions that, when executed by one or more processors, cause the one or more processors to:
  - receive, from a media client, a request,
    - the request including information associated with an event;
  - identify a tracked series, from a tracking list, associated with the request,
    - the tracked series including a plurality of episodes;
  - identify a last watched episode, associated with the tracked series, from a last watched list identifying one or more last watched episodes associated with the media client;
  - identify content metadata associated with the tracked series,
    - the content metadata identifying an availability of one or more of the plurality of episodes associated with the tracked series;
  - determine, based on the last watched episode and the availability identified in the content metadata, a suggested episode, more recent than the last watched episode, associated with the tracked series,
    - the suggested episode being determined based on satisfying an availability threshold, based on satisfying a ranking threshold, and based on an association between the suggested episode and the event,
      - the availability threshold indicating that the suggested episode is available to be watched within a particular time period,
      - the ranking threshold indicating that the tracked series, associated with the suggested episode, satisfies a particular ranking; and
  - send, to the media client, a response identifying the suggested episode.

9. The non-transitory computer-readable medium of claim 8, where the one or more instructions, that cause the one or more processors to identify the tracked series, cause the one or more processors to:
- determine that the request is associated with the media client completing a watched episode;
- identify a watched series associated with the watched episode;
- determine whether a quantity of episodes, associated with the watched series and identified in a watch history, satisfies a threshold; and
- add the watched series to the tracking list based on the quantity of episodes satisfying the threshold, the tracked series being the watched series added to the tracking list.

10. The non-transitory computer-readable medium of claim 8, where the one or more instructions, that cause the one or more processors to identify the tracked series, cause the one or more processors to:
- identify the tracked series based on determining that a ranking, associated with the tracked series, satisfies a threshold.

11. The non-transitory computer-readable medium of claim 8, where the one or more instructions, that cause the one or more processors to identify the tracked series, cause the one or more processors to:
- determine whether a ranking, associated with one of a plurality of series identified in the tracking list, satisfies the ranking threshold; and
- identify the one of the plurality of series as the tracked series based on determining that the ranking satisfies the ranking threshold.

12. The non-transitory computer-readable medium of claim 8, where the one or more instructions, that cause the one or more processors to determine the suggested episode, cause the one or more processors to:
- identify, based on the content metadata, a next episode associated with the tracked series;
- identify a content provider associated with both the next episode and the media client; and
- determine the suggested episode based on identifying the content provider associated with both the next episode and the media client.

13. The non-transitory computer-readable medium of claim 8, where the one or more instructions, when executed by the one or more processors, further cause the one or more processors to:
- receive another request that identifies a to-be-removed series; and
- remove the to-be-removed series from the tracking list based on determining that the other request identifies the to-be-removed series.

14. The non-transitory computer-readable medium of claim 8, where the one or more instructions, when executed by the one or more processors, further cause the one or more processors to:
receive another request that identifies a to-be-added series; and
add the to-be-added series to the tracking list based on determining that the other request identifies the to-be-added series.

15. A method, comprising:
receiving, by a device, a request, associated with a visual or audio series, from a media client,
the request including information associated with an event;
determining, by the device, whether the request identifies completion, by the media client, of a segment of the visual or audio series;
updating, by the device, a first list identifying one or more completed segments associated with the media client, based on determining that the request identifies completion of the segment;
determining, by the device, whether the request is associated with modifying a tracking status associated with the visual or audio series;
updating, by the device, a second list identifying one or more tracked series associated with the media client, based on determining that the request is associated with modifying a tracking status associated with the visual or audio series,
the visual or audio series including a plurality of segments;
identifying, by the device, a last watched segment, associated with the visual or audio series, from the first list;
identifying, by the device, content metadata associated with the visual or audio series,
the content metadata identifying an availability of one or more of the plurality of segments associated with the visual or audio series;
determining, by the device and based on the last watched segment and the availability identified in the content metadata, a suggested segment, more recent than the last watched segment, associated with the visual or audio series,
the suggested segment being determined based on satisfying an availability threshold, based on satisfying a ranking threshold, and based on an association between the suggested segment and the event,
the availability threshold indicating that the suggested segment is available to be watched watch within a particular time period,
the ranking threshold indicating that the visual or audio series, associated with the suggested segment, satisfies a particular ranking; and
sending, by the device and to the media client, a response identifying the suggested segment.

16. The method of claim 15, where sending the response to the media client comprises:
determining whether the segment is more recent than a completed segment, associated with the visual or audio series, identified in a third list associated with the media client, based on determining that the request identifies completion of the segment;
updating the third list to identify the segment as the completed segment based on determining that the segment is more recent; and
sending the response to the media client identifying the suggested segment based on the third list.

17. The method of claim 15, where determining whether the request identifies completion of the segment comprises:
determining a completion level of the segment based on information included in the request;
determining whether the completion level satisfies a threshold; and
determining that the request identifies completion of the segment based on determining that the completion level satisfies the threshold.

18. The method of claim 15, where determining whether the request is associated with modifying the tracking status associated with the visual or audio series comprises:
determining a quantity of segments, associated with the visual or audio series, identified in the first list;
determining whether the quantity satisfies a threshold; and
determining that the request is associated with modifying the tracking status associated with the visual or audio series based on determining that the quantity satisfies the threshold.

19. The method of claim 18, where updating the second list comprises:
updating a ranking, included in the second list, associated with the visual or audio series based on determining that the quantity satisfies the threshold.

20. The method of claim 18, where updating the second list comprises:
updating the second list to identify the visual or audio series.

* * * * *